United States Patent [19]

Gift

[11] 4,384,077

[45] May 17, 1983

[54] PRODUCTION OF ACRYLATE IMPACT RESISTANT MOLDABLE THERMOPLASTIC

[75] Inventor: Warren H. Gift, Morrisville, Pa.

[73] Assignee: Plaskolite, Inc., Columbus, Ohio

[21] Appl. No.: 301,246

[22] Filed: Sep. 11, 1981

Related U.S. Application Data

[63] Continuation of Ser. No. 137,618, Apr. 7, 1980, abandoned.

[51] Int. Cl.³ .................... C08L 33/08; C08L 33/12; C08L 51/00
[52] U.S. Cl. ......................... 525/81; 525/82; 525/85; 525/304; 525/309; 525/243
[58] Field of Search .................... 525/85, 81, 309, 243

[56] References Cited

U.S. PATENT DOCUMENTS

| | | | |
|---|---|---|---|
| 2,992,203 | 7/1961 | Prutzman | 260/45.5 |
| 3,055,859 | 9/1962 | Vollmert | 260/45.5 |
| 3,234,303 | 2/1966 | Bild et al. | 260/876 |
| 3,383,448 | 5/1968 | Bader et al. | 264/214 |
| 3,450,796 | 6/1969 | Griffin | 260/885 |
| 3,661,994 | 5/1972 | Hwa et al. | 260/879 |
| 3,700,754 | 10/1972 | Schmitt et al. | 525/85 |
| 3,793,402 | 2/1974 | Owens | 260/876 R |
| 3,796,677 | 3/1974 | Laber et al. | 260/4 |
| 3,808,180 | 4/1974 | Owens | 260/885 |
| 3,843,753 | 10/1974 | Owens | 260/876 |
| 3,988,392 | 10/1976 | Kameda et al. | 525/85 |
| 4,180,529 | 12/1979 | Hofmann | 525/85 |
| 4,287,317 | 9/1981 | Kitagawa et al. | 525/309 |

*Primary Examiner*—Carman J. Seccuro
*Attorney, Agent, or Firm*—Porter, Wright, Morris & Arthur

[57] ABSTRACT

A process for the production of a moldable thermoplastic having enhanced resistance to impact, and the resulting product, is disclosed. A cross-linked bulk cast elastomer including a graft-linking agent is produced and is then finely divided and compounded with a catalyzed polymerizing monomer mixture, which may also include a minor proportion of a graft-linking co-monomer. Graft-linking of the elastomer to the resulting polymer occurs in situ; and the mass of the elastomer graft-linked to the polymerizing monomer is then compounded with a moldable matrix polymer and the compounded blend is then extruded through a die.

8 Claims, 3 Drawing Figures

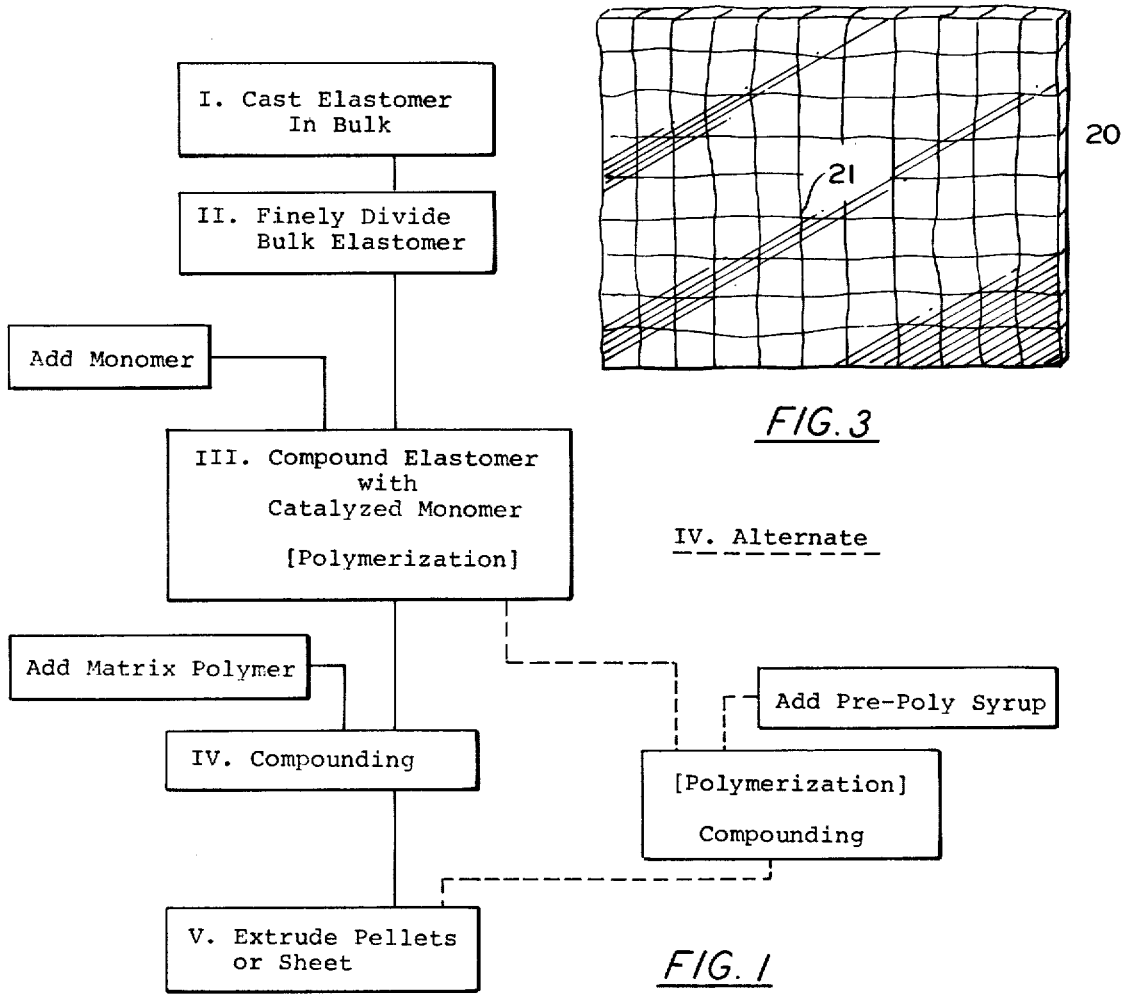
FIG. 3
FIG. 1
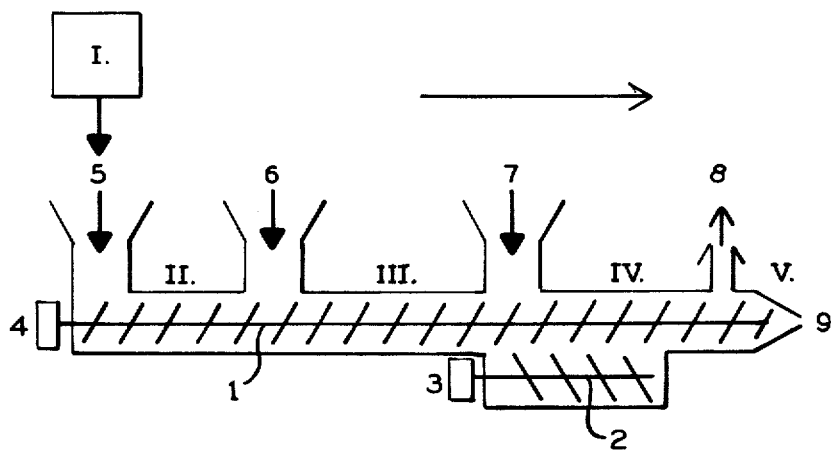
FIG. 2

PRODUCTION OF ACRYLATE IMPACT RESISTANT MOLDABLE THERMOPLASTIC

This is a continuation of application Ser. No. 137,618 filed Apr. 7, 1980 now abandoned.

BACKGROUND OF THE PRIOR ART

It is known in the prior art that the breaking resistance qualities of a rigid thermoplastic with respect to an impact are enhanced by the addition of, by blending and/or mixing, a proportion of an additive having an elastomeric component with the rigid thermoplastic. See, U.S. Pat. No. 2,992,203, Protzman, issued July 11, 1961 entitled "High Impact Resistant Polymers Derived Primarily From Esters of Acrylic and Methacrylic Acids." The prior art includes "elastomeric" additives intended for use in polyvinylchloride plastics, such as described by Ryan et al. in U.S. Pat. No. 3,448,173 issued on June 3, 1969 entitled "Acrylic Modifiers Which Impart Impact Resistance and Transparency to Vinyl Chloride Polymers," and such "elastomeric" additives intended for use in acrylic plastics, such as described by Griffin et al. in U.S. Pat. No. 3,450,796, issued on June 17, 1979 entitled "Production of Thermoplastic Polymeric Materials."

The addition of an "elastomeric" additive to a rigid acrylic thermoplastic has posed some problems which are not normally encountered with polyvinylchloride plastics. Thus, it is known that when an elastomer per se is added to a rigid acrylic thermoplastic: (1) transparency may be adversely affected; and the blended plastic may be susceptible to crazing upon exposure to (2) weather and (3) detergents.

Efforts to develop impact additives which enhance breaking resistance and avoid such adverse effects are described in the abandoned patent application of Ennor et al., Ser. No. 241,486 filed in the U.S. Patent Office on Dec. 23, 1962 entitled "Polymeric Moulding Compositions" and the abandoned patent application of Griffin, Ser. No. 293,194 filed in the U.S. Patent Office on July 5, 1963 entitled "Production of Thermoplastic Polymeric Materials." Bild, et al. refer to both applications in U.S. Pat. No. 3,234,303 issued Feb. 8, 1966 entitled "Continuous Process for the Production of Methacrylate Polymers."

Impact additives of this type are generally discrete, consecutively polymerized particles, including layers of an elastomer and a rigid thermoplastic. E.g., one such additive consists of an emulsion polymerized cross-linked acrylic elastomer, usually a lower alkyl acrylate, to which a rigid acrylic polymer shell, i.e., methyl methacrylate (or co-polymer), is then consecutively polymerized. Such layered particles are then mixed or blended with a rigid thermoplastic acrylic molding powder, (usually a co-polymer of polymethyl methacrylate (PMMA) and polyethyl acrylate (PEA) in the conventional commercial proportion of 96/4::PMMA/PEA). Optimally, a uniform and intimate admixture of the impact resistance enhancing additive particles with the acrylic thermoplastic composition should be achieved.

Variations of this type of impact additive including several consecutively polymerized layers or shells are described by Owens in U.S. Pat. No. 3,793,402 issued Feb. 19, 1974 entitled "Low Haze Impact Resistant Composition Containing A Multi-Stage Sequentially Produced Polymer" and U.S. Pat. No. 3,808,180, issued Apr. 30, 1974 entitled "Composite Interpolymer and Low Haze Impact Resistant Thermoplastic Compositions Thereof." Both of these patents and Owens' U.S. Pat. No. 3,843,753, issued Oct. 22, 1974 entitled "Composite Interpolymer and Low Haze Impact Resistant Thermoplastic Compositions Thereof" show blends of such "layered" or "shelled" impact resistance enhancing additive particles with acrylic thermoplastic materials.

The use of layered consecutively polymerized elastomer containing particles remains today a predominant method for enhancing the impact resistance properties of a rigid thermoplastic. See Hofmann, U.S. Pat. No. 4,180,529, issued Dec. 25, 1979 entitled "Acrylic Multistage Graft Copolymer Products and Processes."

The reason that layered latex particles which contain an elastomeric component in a layered/consecutively polymerized relationship with respect to a thermoplastic must first be made, and then blended, with a rigid thermoplastic, is that an elastomer per se is unmanageable. It is necessary to produce discrete particles with a final compatible "hard" thermoplastic polymer surrounding the elastomer (and other possible layers) so that the resulting particle, containing the elastomer to be added is processable, susceptable of handling, and compatible for blending. The final "hard" polymer shell may be graft-linked to the elastomer or to the preceding "shell." The art has recognized that such layered particles also facilitate the uniform dispersion of the elastomer throughout an acrylic thermoplastic material. [See Hwa et al., U.S. Pat. No. 3,661,994 issued May 9, 1972 entitled "Graft Polymers of Rubber for Reinforcing Plastics."]

In the above-referred patents naming Owens as inventor, it is suggested that composite elastomer/thermoplastic layered particles may be included in a casting mix or syrup which is then used to prepare, by bulk polymerization, a rigid thermoplastic blend having enhanced impact resisting properties. [E.g., Owens, U.S. Pat. No. 3,793,402, supra, Column 10, lines 30 et. seq.] The bulk casting produced consists of a dispersion or suspension of composite layered particles containing an elastomer, distributed throughout the bulk cast rigid thermoplastic. The casting may then be granulated and processed in an extruder, [Id., Column 10, lines 55 et seq.], and the resulting product is a "blend" which has enhanced impact resisting properties.

Similarly, Bild et al. in U.S. Pat. No. 3,234,303, supra, also describe the addition of layered consecutively polymerized emulsion/suspension polymerized particles containing an elastomeric core or subsequent shell (such as described in the abandoned applications filed in the U.S. Patent Office of Ennor et al., Ser. No. 241,486, supra, apparatus employed in a continuous polymerization process to produce an extrudable acrylic polymer in which the additive particles are intimately blended with a principal thermoplastic component. As Bild et al. relate, if the additive is available as a slurry or latex, there is no need to dry off the water if an extruder having a devolatilization zone is used. [U.S. Pat. No. 3,234,303, supra, Column 5, lines 20 et. seq.].

In U.S. Pat. No. 3,796,677, issued Mar. 12, 1974, entitled "Incorporating Rubber Into Thermoplastic" Laber et al. disclose that an elastomer latex including a volume of absorbed water (i.e. a moist latex) may be mixed with a thermoplastic melt and the water thereafter removed by evaporation.

Such prior art methods for the integration of an elastomer into a rigid thermoplastic to provide enhanced impact resisting properties in the resulting product include undesirable process features. Thus, for example, when layered additive particles are produced in a consecutive emulsion process, it may be necessary to dewater and purify the particles. [E.g. Laber et al., U.S. Pat. No. 3,796,677, supra, Column 2, line 41 et seq.]. The criticality of particle size for certain applications (e.g. a large uniform particle size is required for transparency and low haze levels) further makes the maintenance of process parameters more difficult during production. The production of elastomeric latex particles, per se, also presents similar problems.

Purification and size control may require steps of coagulation, precipitation, spray drying, washing, filtration, dewatering and the like. There remains the possibility that impurities from an emulsion or suspension process will remain in the blend and adversely affect its properties. In addition, steps such as spray drying or coagulation may present environmental disadvantages in the disposal of water and/or calcium chloride used in a coagulation process. In any event, when a layered elastomer containing particle is produced by consecutive polymerizations in a latex process and the particle is used as an impact additive for a rigid thermoplastic (by blending the layered particles with the thermoplastic), there are possibilities that impurities remaining from the emulsion process or variation in particle size will remain and adversely affect the blended product.

OBJECTS OF THE INVENTION

It is an object of this invention to produce an acrylic thermoplastic having enhanced impact resisting properties. In contrast with the layered or elastomeric per se, latex particles of the prior art, it is a further object of this invention to produce in bulk, an elastomeric additive for subsequent blending with a moldable acrylic thermoplastic. It is a further object of this invention to provide a process for the uniform dispersion of a bulk elastomeric impact additive throughout such a moldable acrylic thermoplastic material and to provide graft-linking of the thermoplastic to the elastomer in situ. It is yet another object of this invention to provide a "clean" method of producing an acrylic thermoplastic with enhanced impact properties, without the need for drying, coagulation, filtration or devolatilization steps required in prior art methods. As a result, adverse environmental impact is reduced substantially. It is a further object to produce a relatively pure elastomeric acrylic for blending with a thermoplastic acrylic polymer so that the resulting blend avoids impurities that are otherwise introduced when an elastomeric additive is produced in a latex process.

And, beginning with a bulk cast elastomer, it is a further object of this invention to provide a continuous and integrated process for the manufacture of an impact resistant acrylic thermoplastic and to provide a moldable acrylic thermoplastic material which includes the elastomeric additive uniformly dispersed and intimately admixed therein.

Further, in contrast with the prior art, it is an object of this invention to eliminate the separate need to first produce discrete latex particles and/or layered polymers which include an elastomer shell or core, which are then subsequently blended with a monomer mixture or polymer melt. Also it is an object of this invention to avoid many disadvantages incident to the production of a layered elastomeric additive in an emulsion system.

In the process of the present invention, a bulk elastomer is directly blended and uniformly dispersed in a monomeric system where graft-linking occurs. It is thus a further object of this invention to provide a method of impact acrylic production which is environmentally clean and efficient, with minimum waste products, which is readily adaptable to extrusion conditions and offers greater versatility in formulations than the prior art.

And, in addition, it is an object of this invention to provide a moldable acrylic thermoplastic in which a cross-linked elastomer is graft-linked in a polymerizing monomer system and subsequently compounded into a uniform grid or web in the primary thermoplastic matrix material.

It is a further object of this invention to provide a process by which an elastomeric impact additive may be uniformly dispersed throughout a moldable thermoplastic.

While the preferred object of this invention is directed to the blending of an acrylic elastomer with an acrylic thermoplastic, the process of the present invention will find application with respect to other thermoplastic materials such as polystyrene and polyvinyl chloride polymers and co-polymers and other moldable and thermo-forming polymers and co-polymers.

BRIEF DESCRIPTION OF THE DRAWINGS

FIG. 1 is a flow chart showing the steps of the process of the application and an alternative.

FIG. 2 shows an assembly of continuous processing equipment adapted for use in connection with the process of the application.

FIG. 3 shows in stylized form the resulting extruded sheet product produced in following the process of the application.

DETAILED DESCRIPTION OF THE INVENTION

The invention includes (1) a continuous process for the production of an impact resisting thermoplastic composition which is useful for molding and extrusion, and (2) the product produced by the process.

As set forth in the flow chart of FIG. 1, the process consists of the making of a bulk cast elastomer which is then finely divided and compounded with a catalyzed polymerizing monomer mixture. The catalyzed monomer mixture is one capable of producing, when polymerized, a moldable thermoplastic resin. As the catalyzed monomer then polymerizes, graft-linking of the elastomer to the resulting polymer occurs. The resulting mass is compounded with a proportion of further compatible thermoplastic (matrix polymer) to obtain extruded pellets or sheet having the desired proportion of elastomer necessary to achieve a predetermined degree of impact resistance.

There are two distinct masses involved: (1) the elastomer graft-linked to the polymerizing monomer/polymer and (2) the thermoplastic matrix polymer which is added to (1).

Preferably the bulk elastomer consists of a cross-linked lower alkyl acrylate polymer which includes a graft-linking component. As discussed below, the cross-linking and graft-linking co-polymers may be a single bi-functional agent which has both a cross-linking and graft-linking characteristic with respect to a polymerization reaction. For applications where transparency is required styrene may be added as a refractive index modifier. The polymer and additive formulation for the bulk elastomer is in accord with conventional elastomer formulations such as used in latex emulsions, for example, as set forth in the previously mentioned patents and applications of Ennor, supra, Griffin, supra, and Owens, supra.

Thus, as set forth in said references, the bulk elastomer may be polymerized from a monomer mix of at least about 50 to 99.9 weight percent alkyl or aralkyl acrylate, 0.05 to 5.0 weight percent of a cross-linking co-monomer, 0.05 to 5.0 weight percent of a graft-linking co-monomer and 0 to 10.0 weight percent of a hydrophilic co-monomer. A proportion of 0 to 40 weight percent of other compatible co-polymerizable ethylenically unsaturated monomer may also be included. Preferred is an elastomer polymerized from a mix of about 50 to 99.9 weight percent alkyl acrylate, having 1 to 8 carbon atoms in said alkyl group, 0.05 to 5.0 weight percent cross-linking monomer, 0.05 to 5.0 weight percent graft-linking monomer, 0 to 10.0 weight percent hydrophilic monomer, 0 to 49.9 weight percent other acrylic monomers, and 0 to 40 weight percent other non-acrylic ethylenically unsaturated monomers.

The proportion by weight of the (1) polymerized monomer graft-linked to the bulk elastomer to (2) the thermoplastic matrix material may similarly be in the range accepted by the prior art, as described in the foregoing references, i.e., 5–50% with the preferred proportion being 10–30%.

The bulk elastomer is finally divided in the processing apparatus, with the ultimate "particle size" achieved ranging from about 500 A to about 3000 A. To the finely divided bulk elastomer, a catalyzed monomer, pre-polymerized monomer, or monomer/polymer mixture is introduced. The resulting mixture of the elastomer and introduced catalyzed monomer is then intimately admixed and polymerized. Graft linking of the elastomer to the polymerizing monomer takes place while polymerization occurs. Finally, thermoplastic resin is introduced to the graft-linked elastomer and polymerized monomer and is intimately admixed so that the desired proportion of elastomer to thermoplastic is obtained. Pellets or sheet are thereafter extruded.

Because the bulk elastomer is subjected to continuous cutting, pulverizing, compounding and churning as the elastomer is conveyed downstream in the apparatus, the "particles" of elastomer, as referred to herein, are not, and should not be considered a particulate form per se; nor, because a continuous process is involved, should the elastomer "particles" be considered in isolation at any particular time frame or location in the continous processing apparatus. Rather, it is the elastomeric bulk per se which is a component of a singular mass including the polymerizing monomer that is continuously manipulated, physically modified and chemically grafted as it conveys downstream in the processing apparatus. Thus, the foregoing reference to "particle size" is not intended as a limitation on the processing of the bulk elastomer in the initial phase of the process, but is rather intended to describe a preferred range for the ultimate "size" of the grafted elastomeric component as it is finally integrated into the matrix polymer at the conclusion of the process. The grafted elastomeric component is not, however, in theory considered to be a particle in isolation in the process of the invention.

The process of the invention is applicable to acrylic, polyvinyl chloride and polystyrene polymers and copolymers such as referred to in patents of Ryan, supra (U.S. Pat. No. 3,448,173 at Column 11, lines 42 et. seq.; Owens, supra, U.S. Pat. No. 3,843,753 at Column 13, lines 29 et. seq.; and Vollmert, U.S. Pat. No. 3,055,859 entitled "Impact Resistant Plastic Compositions Comprising A Styrene Polymer And A Cross-Linked Acrylic Acid Ester Polymer, And Process For Preparing Same," at Column 4, lines 10 et. seq. See also, Hwa et al., supra, U.S. Pat. No. 3,661,994, Column 3, lines 20 et. seq. The selection of compatible elastomer and thermoplastic systems as well as the determination of appropriate and compatible cross-linking and graft-linking agents, or bi-functional agents, and other functional additives for the elastomer and thermoplastic monomer is within the skill of the art. Examples of overall polymer systems for which this process is useful, and descriptions of compatible monomers, polymers, agents, additives and catalysts, as well as appropriate ranges and proportions for such formulations, are set forth in the various patents referred to above. The application of the invention to such other polymer systems will be apparent to persons skilled in the art from the description provided below of an example setting forth the preferred mode of practicing the invention with respect to an all acrylic system.

EXAMPLE

I. The Elastomer Is Cast In Bulk

A bulk casting of a cross-linked elastomer containing a graft-linking component is made in a suitable container, such as a nylon or polyvinyl alcohol "bag."

The following monomers and functional additives are mixed. A formulation of 4000 total parts by weight ("the elastomeric monomer mix") is provided. A conventional range by weight percent of the various components is also set forth. [See, Owens, U.S. Pat. No. 3,808,180, supra.]

| Component/Function | Parts | Approximate Weight Percent Range |
|---|---|---|
| N—Butyl Acrylate (principal elastomer monomer; lower alkyl acrylate) | 3236.88 | 50 to 94.3 |
| Monomeric Styrene (refractive index modifier; monoethylenically unsaturated co-monomer) | 667.45 | 5 to 20 |
| Butylene Di-Acrylate (cross-linking co-monomer) | 18.54 | 0.05 to 1.0 |
| Allyl Methacrylate (graft-linking agent) | 15.89 | 0.05 to 1.0 |
| Acrylamide (hydrophyllic monomer) | 37.08 | 0.05 to 5.0 |
| Stearic acid | 14.93 | |
| Aerosol OT (bag release agent) | .58 | |
| Tin-U-Vin P (ultraviolet absorber) | 7.47 | |
| Oxalic Acid 2% solution (iron scavenger) | 1.17 | |

Although the above formulation includes separate cross-linking and graft-linking agents, it is the state of the art as noted previously, that a single bi-functional agent, such as allyl methacrylate or other allyl compounds, may take the place of both agents. Such bi-functional agents are co-polymerizable compounds which include two or more addition polymerizable unsaturated reactive groups which participate in a polymerization reaction at substantially different rates. See:

Hofmann, supra, U.S. Pat. No. 4,180,529, issued Dec. 25, 1979, at Examples; Owens, supra, U.S. Pat. No. 3,793,402 at Examples 2-6. In this alternative, the approximate weight percent range of the bifunctional agent is that of the cross-linking co-monomer combined with that of the graft-linking co-monomer.

Also, as in the prior art, other acrylic co-monomers in the proportion of 0 to 50 weight percent may be included in the elastomer formulation.

The following catalysts are added to the monomer-/additive mixture:

|  | Parts per Million |
|---|---|
| Lauryl Peroxide | 150 |
| Benzoyl Peroxide | 150 |
| Tertiary-Butyl-Hydro-Peroxide | 60 |

The catalyzed mixture is introduced into a batch container for bulk polymerization, (the "bag"). Under controlled temperature, polymerization takes place. For the catalyst mixture set forth, in a bulk "bag" polymerization, the initial temperature should be approximately 60° C. This temperature is maintained constant for a period of 7-8 hours; For a "finish off" thereafter, the temperature is increased to 70° C. and maintained for 1 hour; then to 80° C. for 1 hour and then to 90° C. for two hours. For a given weight or volume of elastomeric monomer mix, the specific time and temperature cycles will need to be determined for optimum polymerization by experimentation within the skill of the art depending upon such engineering variables as the size of batch, type and efficiency of heat transfer medium, i.e., air, water, solvent, etc., selection of catalysts, etc. A bulk cast elastomer thus results which is introduced into the continuous processing machinery of the present application.

As an alternative, the elastomer may also be produced in a continuous bulk polymerization process, such as described by Bader, et al., in U.S. Pat. No. 3,383,448 issued May 18, 1968, entitled "Polymerization Process." The bulk elastomer thus produced would be introduced into the continuous apparatus of the present application.

II. The Bulk Elastomer Is Finely Divided

The polymerization "bag" is stripped from the cast elastomer and the bulk elastomer is sectioned and fed into the "particulatizing" section of the continuous processing equipment.

Alternatively, the bulk elastomer may be processed at an extreme low temperature in a liquid nitrogen mill in which the bulk is frozen and processed into particulate form by impact grinding. Such particulate elastomer produced in this alternate method would then be introduced into the continuous processing equipment.

FIG. 2 shows an example of processing machinery used in accord with the process of the application, showing at 1 and 2 the shaft on which functional cutters, vanes and screws are fabricated and drive means at 3 and 4. At 5, the input feed port where the bulk elastomer is introduced to a shredding zone "II" is shown.

III. Catalyzed Monomer Is Added And Graftlinking Occurs During Polymerization With reference to the apparatus of FIG. 2 the elastomer while being "particulatized" in Zone "II" will increase in temperature (to about 50° C.) as it conveys to the polymerization section "III" where a monomer mixture having a principal component of methyl methacrylate is introduced at feed port, 6. A co-monomer or co-monomers may also be included, as well as functional additives. A representative feed formulation is as follows:

|  | Parts per Thousand | Approximate Weight Percent Range |
|---|---|---|
| MMA | 960 | 90 to 98 |
| EA | 40 | 10 to 2 |
| Stearic Acid | 4 |  |
| Lauryl Mercaptan (molecular weight controller) | 3 |  |
| Tin-U-Vin P | 1 |  |

An appropriate catalyst, such as one part per thousand of Tertiary-Butyl-Hydro-Peroxide, is included in the monomer mix. The preferred continuous feed ratio by weight of the bulk elastomer reaching the input port at 6 to the metered catalyzed monomer mixture introduced at input port 6 is 21 parts of elastomer to 9 parts of monomer mix. The range of weight ratios for a 30 part total mixture would be approximately 15 to 5 parts catalyzed monomer to 15 to 25 parts elastomer, i.e., one part monomer for each one to five parts elastomer. Further, in the preferred mode of the invention, an additional proportion of graft linking co-monomer, such as allyl methacrylate, of from 0.05 to 1.0 weight percent may be included in the monomer formulation to insure that a sufficient degree of graft-linking attachment between the bulk polymerized elastomer and polymerizing monomer occurs.

When the particulated elastomer reaches the polymerization section, the elastomer swells upon contact with the monomer mixture and is continued to be shredded, and sheared as it progresses through the zone. The elastomer becomes integrated, by graft-linking, into a polymerizing mass.

The temperature in the metered feed section will start at 80° C. and the meter feed will be at a pressure of 80 to 100 pounds per square inch. As the mixture travels in the processing machinery, the polymerization section is raised in temperature to 125° C. and finally to 150°-175° C. The dwell time of the elastomer/polymerizing monomer mixture in the section will be based on the useful half life of the catalyst selected as well as the intended production volume of the continuous apparatus. For the tertiary butyl hydroperoxide of the example the dwell time would be about 30 minutes at 145° C.

When the mixture reaches input port 7, it is preferred that all the monomer is polymerized. During the polymerization which occurs preceding port 7, graft linking of the resulting PMMA/PEA co-polymer to the elastomer has occurred in situ by reason of the inclusion of a graft linking agent in the monomer formulation of the bulk elastomer. A first discrete mass consisting of a thermoplastic graft-linked to the crosslinked elastomer is thus produced by the time the mixture reaches port 7.

IV. The Graft-Linked Elastomer/Polymer Is Compounded With Matrix Polymer

This mass is conveyed to compounding section "IV" where a conventional moldable acrylic thermoplastic polymer is introduced into the continuous machinery at port 7 in the preferred proportion by weight of 70 parts of moldable polymer to 30 parts of the "in stream" mass reaching port 7. The range of weight ratio for a 100 part total mixture would be approximately 50 to 80 parts moldable polymer to 50 to 20 parts of such "mass." The moldable polymer and the mass are compounded to a uniform composition at a temperature level of 218°–250° C.

As an alternative, a syrup consisting of a 50% "prepoly" mixture, or a mixture of polymer dissolved in monomer (up to 50%) may be separately fed at input port 7 in lieu of thermoplastic material. The processing machinery would, however, have to be adapted to accommodate to the need for polymerizing the additional monomer introduced in the portion of the machinery subsequent to input port 7. The preparation of such a pre-poly syrup is conventional and is known to those skilled in the art.

V. Sheets Or Pellets Are Extruded

The compounded mixture is conveyed to final single screw section "V" which is maintained at a continuous temperature of 250° C. The compounded mix is conveyed to strand die, 9, where the strands are water cooled and fed in a rotary chopper to produce pellets which are collected for further compounding or extrusion. In extrusion section "V" vacuum vent, 8, may be provided so that volatiles such as residual monomer may be removed from the mixture. Sheet material may also be produced at extrusion die, 9.

A recycle loop returning monomer volatiles extracted from vent 8 to monomer input port 6 may also be incorporated in the apparatus.

The product of the invention is a blend of two discrete masses. The first mass is a thermoplastic graft linked to a cross-linked elastomer which is blended with the second mass, a moldable matrix thermoplastic component. In essence, the product resulting is as if an extended elastomeric grid provides impact reinforcement throughout the plane of an extruded thermoplastic sheet such as is depicted in the stylized depiction of FIG. 3 in which 20 is the extruded sheet and 21 is the reinforcing grid of cross-linked elastomer graft-linked to a compatible thermoplastic for integration within the matrix thermoplastic sheet. Compare U.S. Pat. No. 3,661,994, Hwa et al. issued May 9, 1972, supra, FIG. 1–FIG. 3.

Other variations of process and formulations will be apparent to those skilled in the art from the description provided above.

What is claimed is:

1. A process for the manufacture of an extrudable thermoplastic acrylate resin composition in which an acrylate elastomer is incorporated with a principal proportion of a thermoplastic acrylate polymer matrix, including the steps of:

producing, by a bulk polymerization, a cast bulk of cross-linked elastomer from a monomer mix having a principal component of 50 to 99.9 weight percent of a lower alkyl acrylate; a minor proportion of 0.5 to 1.0 weight percent of a cross-linking co-monomer; and a minor proportion of 0.05 to 1.0 weight percent of a graft-linking co-monomer;

finely dividing the bulk elastomer into fine particles having a size ranging from about 500 A to 3000 A;

compounding approximately one to five parts by weight of said finely divided elastomer with one part by weight of a catalyzed monomer mixture which includes methyl methacrylate as a principal component;

polymerizing the catalyzed monomer mixture in the presence of said finely divided elastomer particles to produce a "mass I" in which a portion of said elastomer is graft-linked to a portion of the thermoplastic polymer produced in the polymerizing monomer mixture;

adding to the "mass I" from one to four parts by weight of a composition which is an acrylate polymer or pre-poly syrup or a mixture of polymer dissolved in monomer capable of forming an extrudable acrylate thermoplastic polymer and compounding said composition with one part by weight of the "mass I"; and extruding the composition which results from compounding the "mass I" with the composition capable of forming an extrudable acrylate thermoplastic through a die.

2. A process in accord with claim 1 in which the monomer mix for the cast bulk of cross-linked elastomer includes up to 40 weight percent of a monoethylenically unsaturated co-monomer.

3. A process in accord with claim 1 in which the monoethylenically unsaturated co-monomer is styrene.

4. A process in accord with claim 1 for the manufacture of an extrudable acrylate resin in which:

the cast bulk of cross-linked elastomer is produced from a monomer mix including about 50 to 94.4 weight percent n-butyl acrylate, about 5 to 20 weight percent styrene, about 0.1 to 1.0 weight percent allyl methacrylate and about 0.5 to 5.0 weight percent of a hydrophilic monomer;

the catalyzed monomer mixture with which the finely divided elastomer is compounded includes from 90 to 98 weight percent of methyl methacrylate and 10 to 2 weight percent of ethyl acrylate; and the composition which is capable of forming an extrudable acrylate thermoplastic polymer which is added to and compounded with the "mass I" is a composition which is capable of forming an extrudable acrylate co-polymer of 90 to 98 weight percent of poly (methyl methacrylate) and 10 to 2 weight percent of poly (ethyl acrylate).

5. A process is accord with claim 1 or claim 4 in which the catalyzed monomer mixture with which the finely divided elastomer particles are compounded includes a minor proportion of 0.05 to 1.0 weight percent of a graft-linking co-monomer.

6. The process of claim 1 or of claim 4 in which up to 50% of the composition which is capable of forming the acrylate thermoplastic polymer which is compounded with the "mass I" is a pre-poly syrup.

7. The process of claim 1 in which the cross-linking co-polymer and the graft-linking co-polymer is the same bi-functional agent.

8. The product of the process of claim 1.